United States Patent Office 3,370,086
Patented Feb. 20, 1968

3,370,086
BISOXYPHENYL COMPOUNDS
Everett E. Gilbert, Morris Township, and Pasquale Lombardo, Hanover Township, Morris County, N.J., assignors to Allied Chemical Corporation, New York, N.Y., a corporation of New York
No Drawing. Filed Feb. 26, 1965, Ser. No. 435,723
6 Claims. (Cl. 260—479)

ABSTRACT OF THE DISCLOSURE

This specification discloses 2,2-bis(4'-oxyphenyl)-1,1a, 3,3a,4,5,5,5a,5b,6 - decachlorooctahydro - 1,3,4 - metheno-2H-cyclobuta [cd] pentalene compositions and their preparation. The products are useful as fungicides and as starting materials for the preparation of polycarbonate resins.

A principal object of the present invention is to provide new bisoxyphenyl compounds, and, in particular, new 2,2-bis(4'-oxyphenyl)-1,1a,3,3a,4,5,5,5,5a,5b,6- decachlorooctahydro - 1,3,4 - metheno - 2H - cyclobuta [cd] pentalene and its derivatives. It is a further object of the present invention to provide a process for the preparation of these new bisoxyphenyl compounds. Other objects and advantages will become apparent from the following description.

The compounds of the present invention possess the general formula:

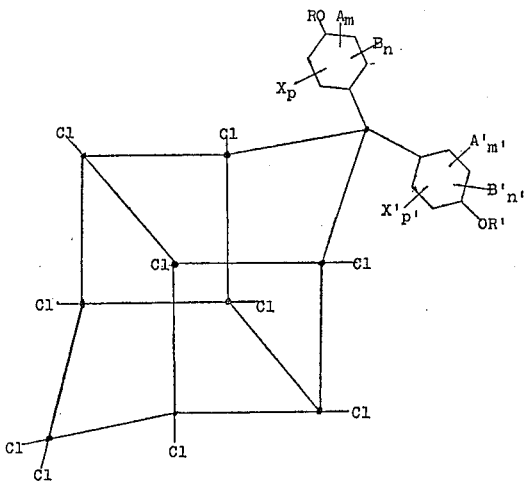

wherein each node represents a tetravalent carbon atom, A, A', B, B', X and X' represent substituents for any one or all of the hydrogens in the phenolic ring, A and A' are methyl, B and B' are ethyl and X and X' are halogens independently selected from the group consisting of chlorine and bromine, R and R' are members independently selected from the group consisting of hydrogen, alkyl and acyl having 1 to 4 carbon atoms inclusive, $n$, $m$ and $p$ are integers from 0 to 4, the sum of $n$, $m$ and $p$ being less than 5 and $n'$, $m'$ and $p'$ are integers from 0 to 4, the sum of $n'$, $m'$ and $p'$ being less than 5. The compound in which R and R' are hydrogen and there is no substitution of the phenolic ring hydrogen atoms has the chemical name 2,2 - bis(4'-hydroxyphenyl)-1,1a,3,3a,4,5, 5,5a,5b,6 - decachlorooctahydro - 1,3,4 - metheno - 2H-cyclobuta [cd] pentalene. The new compounds of the invention will be hereinafter referred to as DCMP bisoxyphenyl compounds.

Generally speaking, the new DCMP bisoxyphenyl compounds are white crystalline solids having a melting point of about 300° C.

The DCCP bisoxyphenyl compounds of the present invention wherein R and R' are hydrogen are useful as intermediates in the preparation of polycarbonate, epoxy, and other types of resins possessing outstanding thermal stability.

The novel compounds of the present invention possess considerable toxicity to fungi and are, therefore, eminently useful as fungicides.

In accordance with the present invention, DCMP bisoxyphenyl compounds may be prepared by reacting $C_{10}Cl_{10}O$ ketone, (1,1a,3,3a,4,5,5,5a,5b,6 - decachlorooctahydro-1,3,4-metheno-2H-cyclobuta [cd] pentalene-2-one), of the formula:

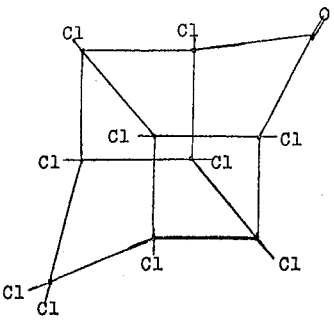

or a hydrate thereof, with a compound having a free para position, of the formula:

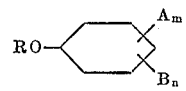

wherein A is methyl, B is ethyl, R is a member selected from the group consistign of hydrogen, alkyl and acyl, $n$ and $m$ are integers from 0 to 4, the sum of $n$ and $m$ being less than 5 in the presence of an acidic condensation catalyst and thereafter recovering the resulting bisphenol from the reaction mixture.

$C_{10}Cl_{10}O$ ketone, hereinafter referred to as DCMP is commercially available, in hydrated form, under the trademark "Kepone," from Allied Chemical Corporation, and is a white solid, and melts with decomposition at about 360° C. This compound and its preparation are disclosed in U.S. Patent Reissues 24,435 and 24,749.

The phenolic reactant utilized in preparing the DCMP bisoxyphenyl compounds of the present invention may be selected from a wide and varied group. Illustrative of suitable phenolic reactants are phenol, o-cresol, m-cresol, 2-ethylphenol, 2,6 - dimethylphenol, 2 - methyl - 6 - ethylphenol, mixtures thereof, and the like. Lower alkyl ethers of these phenols may be used to produce the corresponding alkoxy derivatives.

For effecting the condensation process of the invention, a condensation catalyst, such as a Lewis acid, produces highly desirable results. A Lewis acid is generally defined as an acceptor of an electron pair. Illustrative of such compounds which may be employed in the present process are boron trifluoride, aluminum chloride, ferric chloride, zinc chloride, antimony pentachloride, mixtures thereof and the like.

It should be noted that boron trifluoride may be employed in the form of a complex. More specifically, boron trifluoride may be employed as boron trifluoride phenolate or boron trifluoride etherate.

The molar ratio of the reactants is not critical and good yields have been obtained with an excess of either reactant. These ratios from about ½ to 20 or more mols phenolic reactant per mol DCMP have been found to be suitable.

If desired, a solvent may be employed in order to effect a degree of homogeneity to the reaction mixture. Any suitable solvent may be employed provided it is inert and liquid under the conditions of reaction, and is a solvent for the reactants. Chlorinated aliphatic hydrocarbons or substituted or non-substituted benzene derivatives may be utilized as illustrated by toluene, xylene, chlorobenzene, or tetrachloroethylene. The amount of solvent employed is not critical but in practice from about 1 to 10 parts per part phenolic compound is employed. Recovery of the desired DCMP bisoxyphenyl compounds may be effected by utilizing conventional means. For example, following reaction, the mixture can be water-washed, excess reactants and solvent may be removed by vacuum distillation and the resulting crude DCMP bisoxyphenyl compound taken up in a suitable solvent such as toluene followed by recrystallization, filtration and drying.

In a preferred operation, from about 3 to 10 mols of phenolic reactant or ether derivative thereof are admixed with 1 mol DCMP in the presence of about 2 to 4 parts of solvent. About 1 to 2 mols of boron trifluoride, in the form of its phenolate complex, is then added and the resulting mixture held at a temperature in the range of from about 10° to 140° C., for a period of about 1 to 30 hours.

Upon completion of reaction, the crude DCMP bisoxyphenyl compound is recovered by removing excess phenolic reactant and solvent by distillation. To purify the DCMP bisoxyphenyl compound it may be washed with water until the water-washings exhibit a pH of about 7, then dissolved in hot toluene, recrystallized by cooling and finally isolated by filtration and oven dried.

Alternatively, the alkoxy or acyloxy DCMP compounds may be derived from the DCMP bisphenols. For example, DCMP bisphenol may be esterified by reaction with an acid halide or acid anhydride to produce the corresponding acyloxy derivative. The alkoxy derivative, on the other hand, may be prepared by etherification of the DCMP bisphenol as by reaction with dialkyl sulfate to produce the desired DCMP alkoxy derivative.

Halogen derivatives of DCMP bisoxyphenyl compound may be readily be prepared by simply contacting the bisoxyphenyl compound with suitable chlorinating and brominating agents. Illustrative suitable agents include chlorine gas, bromine gas, liquid bromine, N-bromosuccinimide, metallic hypochlorites, and the like. In preferred operation, the DCMP bisoxyphenyl compound is dissolved in an inert solvent such as ethanol or acetic acid and elemental chlorine or bromine is added. The agent is added to the solution until the desired degree of halogenation is obtained as determined, for example, by sustained color without further addition of halogen. The halogenated DCMP bisoxyphenyl compound is recovered by drowning in water to precipitate the product, then filtering or decanting, or by heating the solution so as to remove any excess halogen, and distilling off the solvent.

The following examples are given for the purpose of illustrating the present invention. In the examples, parts are by weight.

*Example 1*

To a reaction vessel equipped with a thermometer, stirrer, condenser, water trap and inlet tube was charged a mixture comprised of 56 parts (0.10 mol) of DCMP hydrate (0.01 mol H$_2$O) and 200 parts of xylene. The mixture was then azeotroped to remove water-of-hydration and to the resulting anhydrous DCMP were added 9 parts of boron trifluoride and 9.4 parts (0.1 mol) of phenol. The resulting reaction mixture was heated at a temperature of 120° C. for a period of 3 hours. The resulting crude DCMP bisphenols was recovered as on oily material which, upon trituration with carbon tetrachloride yielded 9 parts of DCMP bisphenol as a white solid having a melting point of 266° to 290° C.

*Example 2*

The procedure of Example 1 was repeated with the exception that the reaction time was extended to a period of 18 hours. 23 parts of crude product were obtained. Purification was effected by dissolving the crude product in methylene chloride followed by refluxing in the presence of decolorizing carbon. The reaction mixture was filtered to remove the carbon. The product was purified by dissolving in carbon tetrachloride, evaporating a part of the solvent and separating crystalline product from supernatan tliquid. Recrystallization yielded DCMP bisphenol as a white solid having a melting point of 306° to 308° C.

*Example 3*

Into the reaction vessel of the type described in Example 1 was charged a mixture comprised of 555 (1.0 mol) parts of DCMP hydrate and 1600 parts of toluene. The mixture was then heated at reflux temperature to remove water-of-hydration. The resulting solution contained 491 parts anhydrous DCMP, and was cooled to room temperature followed by the addition of 256 parts of boron trifluoride-phenol complex (2 mols phenol) as catalyst. The reaction mixture was intermittently agitated over a period of 3 days. At the end of this time, 500 parts of water were added and allowed to stand for an additional 18 hours. The aqueous layer was separated and discarded and the remaining organic layer was evaporated off until crystallization of DCMP bisphenol was effected. The 470 parts of crude product obtained were dissolved and heated with decolorizing carbon and finally isolated by recrystallization and filtration. 395 parts of purified product having a melting point of 300°–303° C. and corresponding to a yield of 60% of theory were obtained based on the amount of anhydrous DCMP charged.

*Example 4*

The procedure of Example 3 was repeated with the exception that 1010 parts of DCMP hydrate were used. 628 parts of pure DCMP bisphenol having a melting point of 301 to 306° C. were obtained.

*Example 5*

A reaction mixture comprised of 55 parts of DCMP hydrate were admixed with 256 parts of boron trifluoride complex and stirred for a period of one-half hour. At the end of this period, stirring became difficult and about 85 parts of xylene were added followed by agitation for a period of 24 hours at room temperature (about 25° C.). At the end of this period, 52 parts of DCMP bisphenol, corresponding to a yield of 79% of theory, were obtained based on anhydrous DCMP charged.

*Example 6*

A reaction mixture comprised of 220 parts of DCMP hydrate were admixed with 454 parts of boron trifluoride phenolate and agitated until a solid mass was obtained. The reaction mixture was allowed to stand for a period of 18 hours and then added to 2000 parts of water, followed by agitation and finally filtration. Crude DCMP bisphenol was washed with boiling water to yield a light tan solid. Purification was effected by recrystallizing from a methanol-water solution whereupon 190 parts of purified product having a melting point of 303°–306° C., corresponding to a yield of 71% of theory, were obtained, based on anhydrous DCMP.

*Example 7*

Into the reaction vessel of Example 1 was charged a mixture of 56 parts DCMP hydrate dissolved in 200 parts of xylene. The resulting reaction mixture was azeotroped to remove water-of-hydration. To the resulting anhydrous DCMP dissolved in xylene were added 11 parts of o-cresol and 10 parts of boron trifluoride etherate. The resulting reaction mixture was heated at a temperature of about 110° C. for a period of 18 hours. At the end of this time, excess reactants and solvent were removed by distillation and a total of 43 parts of DCMP bisphenol having the phenolic hydroxy attached in the para position of the ring (2,2-bis(3'-methyl-4'-hydroxyphenyl)-1,1a,3,3,a,4,5,5,5a,5b,6-decachlorooctahydro-1,3,4-metheno - 2H - cyclobuta[cd]pentalene) were obtained. Recrystallization from chloroform yielded a purified product having a melting point of 247–252° C.

Elemental analysis showed 41.8% carbon, 2.5% hydrogen and 50.9% chlorine as compared to the theoretical values of 41.8% carbon, 2.05% hydrogen and 51.5% chlorine.

*Example 8*

10 parts of DCMP bisphenol were dissolved in 400 parts of absolute alcohol. To this mixture were added, under vigorous agitation, 15 parts of potassium bromide dissolved in 100 parts of water followed by the addition of 10 parts of bromine until the solution sustained a permanent yellow color. During addition of the brominating agent, 560 parts of alcohol were added in order to maintain the product and reactants in solution. Recovery of the resulting 2,2-bis(3',5'-dibromo-4'-hydroxyphenyl)-1,1a,3,3a,4,5,5,5a,5b,6-decachlorooctahydro - 1,3,4-metheno-2H-cyclobuta[cd]pentalene was effected by adding to the reaction mixture 250 parts of water with constant stirring. The product precipitated out of solution and the reaction mixture was allowed to stand for a period of about 18 hours. 2,2-bis(3',5'-dibromo-4'-hydroxyphenyl)-1,1a,3,3a,4,5,5,5a,5b,6-decachlorooctahydro - 1,3,4-metheno-2H-cyclobuta[cd]pentalene was recovered by filtration and washed 3 times with a dilute aqueous solution of sodium sulfite followed by washing with water and allowed to air-dry. 13 parts of product having a melting point of about 265° C. were obtained. Subsequent recrystallization from ethanol-water solution and water yielded a purified product as a white solid having a melting point of 349–351° C.

*Example 9*

To the reaction vessel utilized in Example 1 was charged a mixture comprised of 153 parts (0.3 mol) of DCMP hydrate, 294 parts (3.0 mols) of 2,6-xylenol and 10.4 parts of para-toluene sulfonic acid. Resulting reaction mixture was heated at a temperature within the range of 170 to 185° C. for a period of 7 hours. At the end of this period, the reaction was cooled to room temperature and carbon tetrachloride was added to effect precipitation of the resulting 2,2-bis(2',6'-dimethyl) derivative of DCMP bisphenol. Recrystallization from acetic acid in the presence of activated charcoal yielded 30 parts of product as white needles having a melting point range between 290°–312° C., with slight decomposition.

Elemental analysis showed 43.9% carbon, 2.63% hydrogen and 49.5% chloride which is in excellent agreement with the theoretical values of 43.5% carbon, 2.51% hydrogen and 49.5% chlorine.

*Example 10*

To the reaction vessel of Example 1 was charged a mixture comprised of 56 parts DCMP hydrate dissolved in 200 parts of xylene. The mixture was heated to reflux temperature whereupon water-of-hydration was removed. The resulting solution of anhydrous DCMP so obtained, was filtered and 22 parts of methoxy-benzene and 15 parts of boron trifluoride etherate were added, followed by heating at a temperature of 110° C. for a period of 48 hours. At the end of this period, the reaction mixture was allowed to cool whereupon a white solid material precipitated out of solution. Isolation was effected by filtration followed by washing with hexane, purification by recrystallization from chloroform and then subjected to conventional drying procedures. The product, 2,2-bis(4'-methoxyphenyl)-1,1a,3,3a,4,5,5,5a,5b,6 - decachlorooctahydro-1,3,4-metheno-2H-cyclobuta[cd]pentalene, melted at 279° C. to 286° C. Infrared analysis showed the absence of carbonyl groups. Identification of the product so produced was determined by standard demethylation hydrogen bromide procedure. A solution comprising 30% by weight hydrogen bromide dissolved in acetic acid was refluxed with the product for a period of about 18 hours. Toluene was then added and the reaction mixture refluxed for an additional 4 hours. The solvent was removed by vacuum distillation and an oily substance was obtained. Purification of this oily reaction product was effected by trituration with hexane whereupon a solid identified by infrared spectrogram as DCMP bisphenol was obtained. Similarly other lower alkoxy derivatives may be prepared such as the corresponding ethoxy and isopropoxy compounds.

*Example 11*

40 parts of DCMP bisphenol were admixed with about 200 parts of pyridine and placed in a reaction vessel equipped with a stirrer and heating mantle. To this reaction mixture were added 70 parts of acetic anhydride with constant agitation. The reaction mixture was refluxed for a period of 1.5 hours. At the end of this period, the mixture was cooled to room temperature whereupon a white solid material separated and was isolated by filtration. Purification was effected by washing with pyridine and followed by drowning in water. A total of 43 parts white solid were recovered and recrystallized from a mixture of carbon tetrachloride and chloroform to yield 27.5 parts of pure product having a melting point of 294.5°–297° C. The product so obtained was subjected to elemental analysis with the following results which are set forth below in Table III.

TABLE III

| Analysis, percent by weight | Theoretical, percent based upon $C_{26}H_{14}Cl_{10}O_4$ | Found |
|---|---|---|
| Chlorine | 47.7 | 47.8 |
| Carbon | 41.9 | 41.7 |
| Hydrogen | 1.9 | 1.9 |
| Saponification number | 373 | 409 |

The above data indicate that the compound so produced by this example was 2,2-bis(4'-acetoxyphenyl)-1,1a,3,3a,4,5,5,5a,5b,6-decachlorooctahydro - 1,3,4-metheno-2H-cyclobuta[cd]pentalene which is the expected reaction product produced by 2,2-bis(4'-hydroxyphenyl)-1,1a,3,3a,4,5,5,5a,5b,6-decachlorooctahydro - 1,3,4-metheno-2H-cyclobuta[cd]pentalene with acetic anhydride.

Further confirmation was obtained by infrared spectra which showed hydroxyl stretching at 2.93 microns and aromatic C—C double bond, skeletal in-plane vibrations at 6.20, 6.25 and 6.62 microns which indicate the presence of the aromatic rings. Nuclear magnetic resonance also confirmed the chemical structure of DCMP bisphenol.

It is to be understood that the foregoing is by way of illustration and that changes and modifications may be made within the scope of the appended claims without departing from the spirit of the invention.

We claim:

1. 2,2-bis(4' - oxyphenyl) - 1,1a,3,3a,4,5,5,5a,5b,6-decachlorooctahydro - 1,3,4 - metheno - 2H - cyclobuta[cd] pentalene having the structural formula:

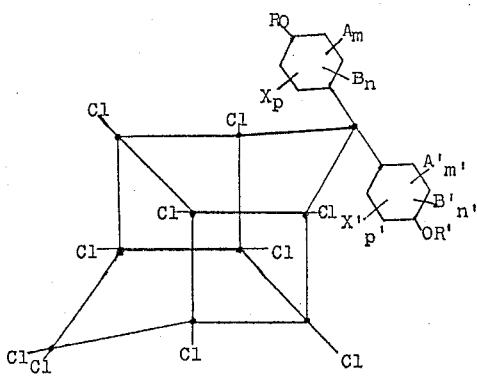

wherein the A and A' are methyl, B and B' are ethyl, R and R' independently represent a member of the group hydrogen, acetyl and alkyl of from 1 to 4 carbon atoms, X and X' are halogen independently selected from the group consisting of chlorine and bromine; $n$, $n'$, $m$, $m'$, $p$ and $p'$ are integers from 0 to 4; the sum of $n$, $m$, and $p$ being less than 5; the sum of $n'$, $m'$ and $p'$ being less than 5.

2. 2,2-bis(4'-hydroxyphenyl) - 1,1a,3,3a,4,5,5,5a,5b,6-decachlorooctahydro-1,3,4-metheno - 2H - cyclobuta[cd] pentalene having the structural formula:

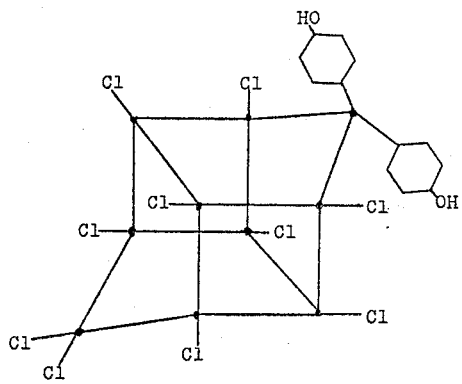

3. 2,2-bis(3'-methyl - 4' - hydroxyphenyl)-1,1a,3,3a,4,5,5,5a,5b,6 - decachlorooctahydro - 1,3,4 - metheno-2H-cyclobuta[cd]pentalene having the structural formula:

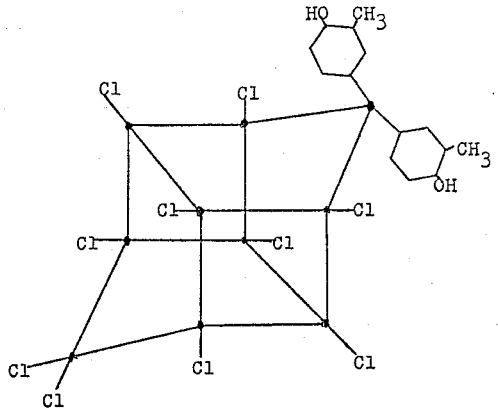

4. 2,2-bis(3',5'-dibromo - 4' - hydroxyphenyl)-1,1a,3,3a,4,5,5,5a,5b,6 - decachlorooctahydro-1,3,4-metheno-2H-cyclobuta[cd]pentalene having the structural formula:

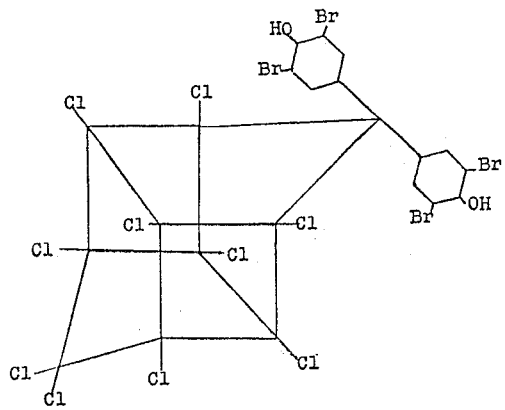

5. 2,2-bis(4'-methoxyphenyl) - 1,1a,3,3a,4,5,5,5a,5b,6-decachlorooctahydro - 1,3,4 - metheno-2H-cyclobuta[cd] pentalene having the structural formula:

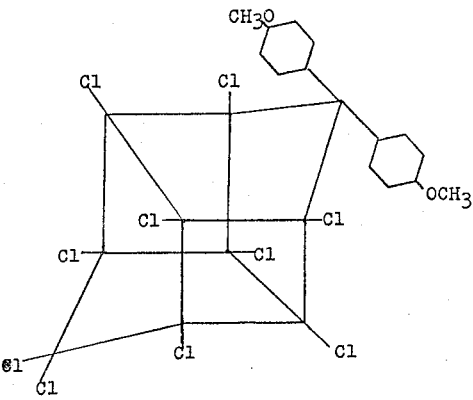

6. 2,2-bis(4'-acetoxyphenyl) - 1,1a,3,3a,4,5,5,5a,5b,6-decachlorooctahydro - 1,3,4 - metheno-2H-cyclobuta[cd] pentalene having the structural formula:

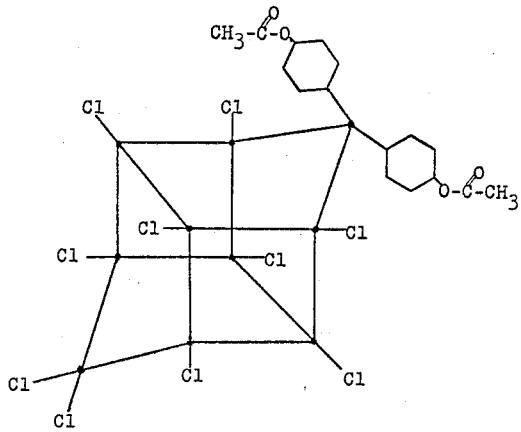

References Cited

UNITED STATES PATENTS 3,185,736   5/1965   Ellingboe _____ 260—619

FOREIGN PATENTS 515,907   12/1939   Great Britain.

LEON ZITVER, *Primary Examiner.*

H. ROBERTS, *Assistant Examiner.*